United States Patent [19]
Haas et al.

[11] 3,873,713
[45] Mar. 25, 1975

[54] STABILIZED PARTICULATE VITAMIN C COMPOSITION

[75] Inventors: Walter Haas; Hans-Günther Zeller, both of Grenzach, Germany

[73] Assignee: Hoffmann-LaRoche Inc., Nutley, N.J.

[22] Filed: July 2, 1973

[21] Appl. No.: 375,559

Related U.S. Application Data

[63] Continuation of Ser. No. 102,090, Dec. 28, 1970, abandoned, which is a continuation-in-part of Ser. No. 731,322, May 22, 1968, abandoned.

[52] U.S. Cl............................. 424/280, 424/184
[51] Int. Cl............................................. A61k 27/00
[58] Field of Search............................ 424/184, 280

[56] References Cited
UNITED STATES PATENTS

| | | | |
|---|---|---|---|
| 2,400,171 | 5/1946 | Ruskin | 424/280 |
| 2,454,747 | 11/1948 | Weisblat et al. | 424/280 |
| 2,454,749 | 11/1948 | Wise | 424/280 |
| 2,512,192 | 6/1950 | Yen et al. | 424/32 X |
| 3,106,492 | 10/1963 | MacDonald et al. | 117/100 X |
| 3,197,369 | 7/1965 | Widmann et al. | 424/32 |
| 3,202,731 | 8/1965 | Grevenstuk et al. | 117/100 X |
| 3,279,996 | 10/1966 | Long, Jr. et al. | 424/32 X |
| R25,205 | 4/1962 | Feinstone | 424/32 X |

*Primary Examiner*—Albert T. Meyers
*Assistant Examiner*—Norman A. Drezin
*Attorney, Agent, or Firm*—Samuel L. Welt; Jon S. Saxe; R. Hain Swope

[57] ABSTRACT

A stable particulate vitamin C composition is described which comprises ascorbic acid, isoascorbic acid, or a salt or ester of either in the form of discrete particles, each particle of which is substantially uniformly coated with an organic polysiloxane. The polysiloxane coating, which does not substantially alter the size or shape of the particles, gives said particles excellent flow properties and stability and facilitates compression of such particles into tablets.

3 Claims, No Drawings

STABILIZED PARTICULATE VITAMIN C COMPOSITION

RELATED APPLICATIONS

This application is a continuation of application Ser. No. 102,090, filed Dec. 28, 1970, now abandoned, which is a continuation-in-part of U.S. patent application Ser. No. 731,322 filed May 22, 1968, now abandoned.

BACKGROUND OF THE INVENTION

It has long been recognized in the art of pharmaceutical compounding that certain vitamin C active substances such as ascorbic acid, isoascorbic acid and certain derivatives thereof are relatively unstable when subjected to certain chemical influences. For example, atmospheric oxygen, moisture and certain chemicals such as, for example, certain iron salts, have a deleterious effect on these compounds. In an effort to remedy this problem there have been numerous attempts in the prior art to prepare stable forms of vitamin C active substances, particularly in particulate form. It is desirable to prepare such stable particles as they can be utilized not only in the preparation of stable tablets, but also in preparing dry particulate compositions such as, for example, animal feed supplement concentrates. It can readily be seen that, other factors being equal, it is much more desirable to coat individual particles of vitamin C active substance than to apply an exterior protective coating of a material such as, for example, a silicon to a finished tablet as such an exterior coating affords no protection against the deleterious effects of small amounts of moisture which may be present within the tablet. Such a coating is also of no value in increasing the flow properties and handling of the particles of active substance which comprise the tablet.

Among the substances which have been proposed in the prior art for the coating or vitamin C active substances are ethyl cellulose, cetyl alcohol, hard fat and the like. These materials were generally applied by mixing the particles of vitamin C active substance with a solvent containing the coating material and, subsequently, removing the solvent. This method and the resultant coatings with such prior art materials have proved unsatisfactory for several reasons. First, the particles so coated are, often times, much larger in size than the uncoated starting materials. Such coated particles are also often nonuniform in shape. The disadvantage of having large, nonuniformly coated particles is particularly troublesome in the compounding of multivitamin tablets wherein not only the stability of the finished tablet is critical but also the size as the tablet must be of a size which is easily ingested. In preparing such tablets, it is very important to have each ingredient take up a minimum amount of volume to keep the finished tablet at such a useable size and weight.

Another disadvantage of such prior art methods is that agglomeration of the coated materials often occurs thus rendering the particles difficult and expensive to handle and unsuitable for certain uses such as, for example, the formulation of dry feed additives which must be free-flowing and uniform. In addition, the agglomerates must be broken apart, with the attendant risk of damaging the coating layer.

Another teaching in the prior art which is pertinent to the present considerations is that of Reissue U.S. Pat. No. 25,205 wherein particles of a carrier substance which may have therapeutic activity are intimately surrounded, or "coated" with fine particles of a polysiloxane resin. This method, although inherently having some positive affect on the stability as well as flow properties and handling of such carrier substances, suffers two disadvantages. The main disadvantage of this method is that the added particles of polysiloxane do not completely coat and therefore do not completely protect the particles of carrier substance thereby still rendering such particles susceptible to deleterious forces, such as moisture, within the tablet. A second disadvantage is that the added weight and volume inherent in this process can create problems in the compounding of tablets where a number of active substances must be present, such as multivitamin tablets wherein the weight and volume of each individual ingredient are critical factors. The added weight and volume are not critical in the teachings of the patent as the only stated purpose of the polysiloxane is to relieve flatulence and protect the walls of the gastro-intestinal tract.

In distinct contrast to these prior art practices, the present invention provides stable particulate compositions of a vitamin C active substance each particle of which is substantially uniformly coated with an organic polysiloxane. These small discrete particles are stable, non-agglomerating and possess excellent tabletting and flow properties.

BRIEF SUMMARY OF THE INVENTION

The present invention provides compositions comprising a vitamin C active substance selected from the group consisting of ascorbic acid, isoascorbic acid, a salt of either with a medicinally acceptable base or an ester of either with an aliphatic alcohol, in the form of small, discrete stable particles each of which is substantially uniformly coated with an organic polysiloxane. The coating of organic polysiloxane on the particles of the present invention does not substantially increase their size, yet renders them flowable, non-agglomerating and ideally suited for the formation of tablets. In producing the compositions of the present invention, an organic siloxane monomer, dissolved in an appropriate organic solvent, is applied to small discrete particles of a vitamin C active substance and, while in contact therewith, said monomer is caused to polymerize thus forming the desired coating.

As used herein the phrase "a vitamin C active substance" is a substance selected from the group consisting of ascorbic acid, isoascorbic acid, salts of each with a medicinally acceptable base, or esters of each with an aliphatic alcohol. Where a salt is used, inorganic salts, such as alkali metal or alkaline earth metal salts are preferred. Especially preferred salts are sodium and potassium ascorbate or isoascorbate. Among the preferred esters utilized in the practice of the present invention are those formed by reaction with an aliphatic alcohol containing from one to seventeen carbon atoms. Especially preferred esters are palmitoyl, stearyl or diacetyl ascorbate or isoascorbate. It is to be understood, therefore, that the term "vitamin C active substance" as utilized hereinafter, denotes any of the substances named above.

The size of the vitamin C active particles utilized in the practice of the present invention is not particularly critical. It is also not critical whether the vitamin C active substance is in powder or crystalline form. One advantage of the process of coating the vitamin C active substance in accordance with the present invention is that the size of the particles to be coated may be adjusted before coating to meet the requirements of the use intended, e.g., comparatively larger particles for preparation of animals feed supplements, smaller particles for the preparation of multivitamin tablets and the like. In the preferred embodiments of the present invention, however, crystalline ascorbic acid is utilized.

The coated vitamin C active composition of the present invention is obtained by causing an organic siloxane monomer to polymerize while in intimate contact with discrete particles of a vitamin C active substance. This process imparts certain distinctive properties to the thus-coated particles. For example, by polymerizing the monomer in situ a uniform coating which intimately adheres to the particles of vitamin C active substance is produced. In addition, the particles of vitamin C active substance produced in accordance with the present invention are substantially the same size and shape as were the particles of uncoated starting material. All of these properties serve to enhance the stability of a vitamin C active substance of the present invention by substantially reducing the exposure of the active substance to atmospheric oxygen or moisture and to protect it from other substances which, in intimate contact with the vitamin C active substances of this invention, may have a deleterious effect thereon.

The conditions which the products of the present invention are produced are important. The individual particles of vitamin C active substance should be kept physically separate during the polymerization of the monomeric coating material. In one embodiment of the invention, this is accomplished by dispersing ascorbic acid particles, in a stream of air, in a fluidized bed drier. A solution of the siloxane monomer in a volatile organic solvent is sprayed into the drier onto the dispersed particles. The siloxane is allowed to polymerize on the individual ascorbic acid particles while said particles are in the dispersed state. In an alternate embodiment, the purposes of the invention are achieved by adding a solution of the organic siloxane monomer in a quantity sufficient to wet the particles to be coated. Thereafter, the wetted mixture is transferred to a fluidized bed drier where the monomer is caused to polymerize in a stream of air.

In the practice of the invention, any organic siloxane monomer can be used which, under the conditions described herein, polymerizes to form a non-toxic layer on the individual particles of ascorbic acid. Such suitable monomers include both alkyl siloxanes such as, for example, methylsiloxane, and aryl siloxanes such as, for example, phenylsiloxane. However, due to the fact that it rapidly polymerizes at relatively low temperatures, methylsiloxane is preferably employed.

The temperature at which the coating is applied is variable depending upon the identity of the particular organic siloxane monomer in use. For example, the coating operation can be carried out at a temperature within the range of from about room temperature to about 150°C. Generally, however, a temperature within the range of from about 50° to about 100°C., and preferably between 60° and 80°C., will be employed. The heat, where an elevated temperature is used, is generated by preheating the stream of air which is passed into the fluidized bed drier to disperse the particles. Where the polymerization is carried out at room temperature, an unheated stream of air is forced into the drier.

As indicated heretofore, the polymerizable, organic siloxane compound is used in the practice of the invention in the form of a solution in an invert volatile organic solvent. In generaly any volatile organic liquid which is a solvent for the organic siloxane compound in use can be employed. For example, one can use, as the solvent, a ketone, a mixture of a ketone with a lower aliphatic alcohol or an aromatic hydrocarbon, or a chlorinated hydrocarbon, such as methylene chloride. In the preferred embodiment of the invention, either acetone or a mixture of acetone with a lower aliphatic alcohol, such as, ethyl alcohol, or a chlorinated hydrocarbon, such as methylene chloride, is employed. If desired, however, an aromatic hydrocarbon, such as toluene can be used.

The concentration of the siloxane solution which is used in the practice of the invention is not particularly critical. In general, however, a solution which contains from about 10 to about 50 percent by weight of the organic siloxane monomer will be employed. Furthermore, although not essential to the operability of the invention, a suitable polymerization catalyst can be incorporated into the system. This can be accomplished, conveniently, by adding the polymerization catalyst to the siloxane solution. Suitable for use as the polymerization catalyst are organic amines, such as, triethylamine, dibutylamine or tributylamine.

The quantity of polysiloxane compound which is present as the coating of the final product is variable within certain limits. It has been found, however, that coated vitamin C active substance particles which contain from about 1 to about 20 percent, and, preferably, from about 3 to about 6 percent by weight of the organic polysiloxane possess outstanding properties.

The coated vitamin C active substances produced in accordance with the present invention exhibit an outstanding variety of desirable characteristics. The uniform, substantially complete coating of the particles protects the otherwise unstable vitamin C active substances from degradation due to the effects of atmospheric oxygen, moisture, and incompatible substances. Further, since the coating is applied by the polymerization of the siloxane monomer in situ while in intimate contact with the vitamin C active substance particles, and effective coating is achieved without substantially increasing the size or weight or otherwise altering the shape of the particles. This phenomenon is extremely important in the use of the coated vitamin C active substances of the present invention in the formulation of multivitamin tablets as the weight and relative volume of each component of such tablets is highly critical in keeping the final size and weight of the tablets at a minimum. Agglomeration, and its inherent disadvantages, is not a problem with vitamin C active substance particles as produced by the method of the present invention. Moreover, since the method of the present invention provides an extremely thin film, no great difficulty is encountered in dissolving the coated vitamin C active substance of the invention in water. If necessary in any particular instance, solubilization of the product can be facilitated by means of the use of a small quantity of a surface active agent. The products of the present invention possess exceptional flow properties and characteristics which readily facilitate their compression into tablets. To a great extent these properties and characteristics obviate the use of lubricants, such as, talc, and anti-sticking agents, such as, magnesium stearate, in the tabletting operation.

These protective ability of the compositions of the present invention can be demonstrated by the following experiment. 50 Grams of crystalline ascorbic acid were mixed with 1 g. of a silicone oil having a viscosity of 3,000 cSt. The silicone oil utilized is a polysiloxane material of the type of the anti-foaming agent "DC Antifoam A" manufactured by Dow Chemical Co. The vitamin C silicone oil bath was placed in a Petri dish and stored for three months at 45°C. and 95 percent relative humidity. 50 Grams of crystalline ascorbic acid coated in the manner of the present invention were stored under similar conditions. At the end of this time the vitamin C coated in accordance with the present invention had undergone only very slight discoloration whereas the vitamin C which had been worked into a caked mass with particles of polysiloxane had undergone very severe discoloration and had become a brown color.

A second experiment which demonstrates only one of the advantages of coating particles of a vitamin C active substance in accordance with the present invention over the prior art method of coating a finished tablet with a silicon material was conducted as follows. Using a 4 percent by weight aqueous gelatin solution as a tabletting adjunct tablets were prepared according to the formulations as follows.

| Ingredient | Amount |
| --- | --- |
| Type A Tablets | |
| Ascorbic Acid coated in a manner of the present invention | 100 mg. |
| Lactose | 50 mg. |
| Hydrolyzed Starch | 50 mg. |
| Magnesium Stearate | 5 mg. |
| Type B Tablets | |
| Uncoated Ascorbic Acid | 100 mg. |
| Lactose | 50 mg. |
| Hydrolyzed Starch | 50 mg. |
| Magnesium Stearate | 5 mg. |

The tablets of Type B coated, after being formed, with a silicone resin the approximate weight of which comprised 7.0 mg. per tablet. Type A and B tablets were tested in order to determine the rate at which the active substance, i.e., ascorbic acid was released. The results of this test are summarized in the following table.

TABLE

| Released Weight in Percent | Tablet A Time in Seconds | Tablet B Time in Seconds |
| --- | --- | --- |
| 25 | 90 | 465 |
| 50 | 200 | 660 |
| 75 | 300 | 870 |
| 100 | 465 | 1280 |

The above data indicates that the release rate of tablets prepared in accordance with the present invention is advantageously about 3 times higher than vitamin C tablets coated with an exterior coating of silicone resin as prepared by prior art methods. In addition, tests have shown that the particles of vitamin C active substance prepared in accordance with the present invention are clearly superior in flow properties, chemical stability, tabletting properties, and color stability in comparison to particles coated with such prior art substances as cetyl alcohol, stearyl alcohol, and hard fat.

The following examples are given as further illustrations of the invention and are not to be construed in a limiting sense.

EXAMPLE 1

In this example, 130.0 kg. of crystalline ascorbic acid were charged into a fluidized bed drier. The individual crystals were set into moderate motion by the injection, into the drier, of air pre-heated to a temperature of about 60°C. Thereafter, a mixture of 8.0 kg. of a silicone resin lacquer, the nature of which is described hereinafter, and 13.2 kg. of ethyl alcohol were sprayed into the drier in such a manner as to wet the dispersed ascorbic acid crystals. As the silicone resin lacquer, there was used a product which is commercially available as "Silicone Resin Lacquer HK 15 A 50 percent", from Wacker-Chemie, G.m.b.H., Munich, Germany. The product consisted of a 50 percent by weight solution of methyl siloxane in acetone. The mixture of the silicone product and ethyl alcohol was sprayed into the drier for a period of about fifteen minutes, following which the spraying was discontinued. For a period of about twenty minutes thereafter, the crystals were dried by the continued passage of air, heated to a temperature of about 60°C., into the fluidized bed drier.

By the described procedure, there was obtained a stabilized ascorbic acid composition in the form of small, discrete particles, each of which was completely enveloped by a thin layer of methyl polysiloxane. By a screen analysis it was determined that the sieve characteristics of the stabilized particles were essentially the same as those of the ascorbic acid crystals which were used as the starting material. No undue coarsening of the individual particles was produced by the coating operation.

Each coated particle, produced as described in this example, contained about 97.2 percent by weight of ascorbic acid.

EXAMPLE 2

In this example, 100.0 kg. of crystalline ascorbic acid were introduced into a planetary mixer. The crystalline material was thoroughly mixed and, during the mixing process, it was treated, portion-wise, with a solution of 12.0 kg. of Silicone Resin Lacquer HK 15 A 50 percent in 12.0 kg. of methyl alcohol. When the crystalline ascorbic acid was completely wetted with the silicone resin lacquer solution, this having been accomplished by mixing for about ten minutes, the wetted mixture was introduced into a fluidized bed drier where it was set into moderate motion by the introduction of a stream of air, pre-heated to a temperature of about 70°C. Passage of the pre-heated air into the drier was continued for a period of about 20 minutes.

There was, thus obtained, a stabilized ascorbic acid composition, in the form of discrete particles, each particle being completely enveloped by a thin layer of methyl polysiloxane. By screen analysis it was determined that the sieve characteristics of the stabilized product were essentially the same as those of the ascorbic acid crystals which were employed as the starting material.

Each coated particle, produced as described in this example, contained about 94.1 percent by weight of ascorbic acid.

EXAMPLE 3

The procedure of Example 2 was repeated with the only difference being that methylene chloride (12.0 kg.) was used instead of methyl alcohol.

The characteristics of the ascorbic acid so coated were identical to those of the ascorbic acid obtained according to Example 2. Each coated particle contained about 94.1 percent by weight of ascorbic acid.

We claim:

1. A stable, vitamin C active composition consisting essentially of free-flowing, non-agglomerating, discrete particles comprising a vitamin C active substance selected from the group consisting of ascorbic acid, isoascorbic acid, a salt of ascorbic acid with a medicinally acceptable base, a salt of isoascorbic acid with a medicinally acceptable base, an ester of ascorbic acid with an aliphatic alcohol containing from one to seventeen carbon atoms and an ester of isoascorbic acid with an aliphatic alcohol containing from one to seventeen carbon atoms, each individual discrete particle having a substantially uniform coating consisting of an organic polysiloxane obtained by the in situ polymerization on each discrete particle, said particles being maintained physically separate, of a solution containing from about 10 percent by weight to about 50 percent by weight of a siloxane selected from the group consisting of methyl siloxane and phenyl siloxane in an inert, volatile organic solvent at a temperature of from about room temperature to about 150°C, said coating comprising from about 1 percent by weight to about 20 percent by weight of said composition.

2. The stable composition of claim 1 wherein said vitamin C active substance is ascorbic acid and said coating comprises from about 3 percent by weight to about 6 percent by weight of said composition.

3. The stable composition of claim 2 wherein said organic polysiloxane is methyl polysiloxane.

* * * * *

UNITED STATES PATENT OFFICE
CERTIFICATE OF CORRECTION

Patent No. 3,873,713    Dated March 25, 1975

Inventor(s) Walter Haas and Hans-Gunther Zeller

It is certified that error appears in the above-identified patent and that said Letters Patent are hereby corrected as shown below:

Please insert on the cover page of the patent the following:

Foreign Application Priority Data

[30]    June 30, 1967    Switzerland    9359/67

Column 2 of same page, last reference cited, R25,205 should read:

RE 25,205

Signed and Sealed this

Tenth Day of August 1976

[SEAL]

Attest:

RUTH C. MASON
*Attesting Officer*

C. MARSHALL DANN
*Commissioner of Patents and Trademarks*